United States Patent
Izumi et al.

(10) Patent No.: US 7,180,269 B2
(45) Date of Patent: Feb. 20, 2007

(54) BATTERY CHARGING METHOD

(75) Inventors: Yoshikazu Izumi, Tokushima (JP); Yasushi Kuroda, Itano-Gun (JP); Akio Furukawa, Itano-Gun (JP); Takahiro Yamashita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 264 days.

(21) Appl. No.: 10/896,013

(22) Filed: Jul. 22, 2004

(65) Prior Publication Data
US 2005/0017692 A1 Jan. 27, 2005

(30) Foreign Application Priority Data

Jul. 25, 2003 (JP) ............................. 2003/279605
Oct. 8, 2003 (JP) ............................. 2003/349543

(51) Int. Cl.
H02J 7/04 (2006.01)
H02J 7/16 (2006.01)
H02J 7/06 (2006.01)
H02J 7/24 (2006.01)

(52) U.S. Cl. ..................... 320/150; 320/158; 320/154
(58) Field of Classification Search ................ 320/150, 320/154, 158
See application file for complete search history.

(56) References Cited

U.S. PATENT DOCUMENTS 5,773,956 A * 6/1998 Wieczorek ................. 320/152
6,075,339 A * 6/2000 Reipur et al. ............... 320/110
6,326,767 B1 * 12/2001 Small et al. ................ 320/116

FOREIGN PATENT DOCUMENTS

JP 7-15884 1/1995

OTHER PUBLICATIONS

Machine Translation to Kenji et al. (JP 7-158840 (Jan. 1995).*

* cited by examiner

Primary Examiner—Adolf Berhane
Assistant Examiner—Yalkew Fantu
(74) Attorney, Agent, or Firm—Wenderoth, Lind & Ponack, L.L.P.

(57) ABSTRACT

The battery charging detects battery temperature and includes a temperature maintaining charging operation wherein average charging current is controlled to drive battery temperature to a holding temperature, and charging is performed while maintaining battery temperature at that holding temperature. In addition, a temperature increasing charging operation occurs prior to the temperature maintaining charging operation. The battery is charged with a current which raises battery temperature until the holding temperature is reached. When battery temperature rises to the holding temperature in the temperature increasing charging operation, charging can transition to the temperature maintaining charging operation.

16 Claims, 3 Drawing Sheets

BATTERY CHARGING METHOD

BACKGROUND OF THE INVENTION

This invention relates to a method for rapidly charging a battery in as short a time as possible.

There are essentially two types of related art battery charging methods which rapidly charge a battery. The first type of charging method charges a battery with a constant current until full charge is reached. This charging method is adopted for nickel hydrogen batteries and nickel cadmium batteries. This charging method detects peak battery voltage or a ΔV voltage drop from the peak battery voltage to determine full charge and terminates charging. The second type of charging method performs constant voltage charging after constant current charging, and is adopted for lithium ion batteries. This charging method detects voltage rise until a charging termination voltage is reached, then full charge is assumed and charging is terminated.

These types of charging methods continuously charge primarily while detecting battery voltage. However, battery temperature rises during charging, and batteries have the property that performance degrades when battery temperature becomes abnormally high. To avoid this drawback, a charging method has been developed which also detects battery temperature and controls charging current to keep battery temperature from becoming abnormally high and charging efficiency from decreasing (Patent Reference 1: Japanese Non-examined Patent Publication HEI 7-15884 (1995)).

In the charging method cited in this disclosure, rechargeable battery temperature is detected, and the duty factor of the pulse charging current is changed in an effort to decrease battery temperature rise. If a battery is charged with constant current, battery temperature rises as shown by curve A of FIG. 1. As shown by curve A, battery temperature rises sharply as full charge is approached. Curve B of FIG. 1 shows variation in battery voltage during charging. In curve B, the battery is fully charged when battery voltage reaches its peak voltage, or after a ΔV voltage drop from the peak voltage. Based on this, the battery has the property that temperature rises radically when full charge is approached. If battery temperature becomes high, it causes battery performance degradation. When battery temperature is high, the charging method cited in the disclosure above reduces the duty factor of the charging current to prevent performance degradation due to high battery temperature. As shown by the solid line of FIG. 2, battery temperature rise is moderated by this action. In particular, temperature rise at full charge can be reduced. Consequently, battery performance degradation due to battery temperature rise at full charge can be prevented.

SUMMARY OF THE INVENTION

The charging method cited in the above disclosure charges a battery while reducing battery temperature rise by decreasing the duty factor of the charging current. As a consequence, although the charging method of this same disclosure can prevent battery temperature from rising abnormally high at full charge, it cannot rapidly charge a battery in a short time. The present invention was developed with the object of further improving related art charging methods by providing a charging method which does not degrade battery performance and can rapidly charge a battery in a short time.

The above and further objects and features of the invention will more fully be apparent from the following detailed description with accompanying drawings.

The battery charging method of the present invention comprises a temperature maintaining charging step wherein battery temperature is detected, average charging current is controlled to drive battery temperature to a set holding temperature, and charging is performed while maintaining battery temperature at that holding temperature.

The charging method above has the characteristic that a battery can be rapidly charged in an extremely short time without degrading battery performance. This is because this charging method charges while maintaining battery temperature at the holding temperature. For example, it is possible to rapidly charge a battery with high current at the holding temperature, which is near the maximum value but still below the temperature where performance degradation and deleterious effects occur to the battery being charged.

In this battery charging method, the holding temperature can be 50° C. to 65° C.

Further, the battery charging method can be provided with a temperature increasing charging step, prior to the temperature maintaining charging step, wherein the battery is charged with high current which raises battery temperature to the holding temperature. This method charges via the temperature increasing charging step until battery temperature reaches the holding temperature, subsequently it transitions to the temperature maintaining charging step to charge while maintaining the holding temperature.

In this battery charging method, after battery temperature is raised to a specified temperature by high current charging in the temperature increasing charging step, charging is performed while controlling average charging current to maintain the holding temperature in the temperature maintaining charging step.

This method does not prevent battery temperature rise at the end of charging as in related art methods, but rather raises battery temperature by charging with extremely high current immediately after commencing charging. This high current charging is during a time when battery temperature essentially does not rise in related art methods. Since the temperature increasing charging step raises battery temperature at a time when temperature does not rise in related art methods, this step can charge with extremely high average charging current compared to the related art methods. Subsequently, since battery temperature is maintained at the holding temperature in the temperature maintaining charging step, average charging current is allowed to be the maximum current which does not cause battery performance degradation. Consequently, this charging method is characterized by charging in a short time, which has no comparison with related art methods, and which can be, for example, 30 minutes or less.

In the temperature increasing charging step, the battery charging method can charge with 1.5 C to 10 C (during charging, 1 C is the current that charges a battery to its full capacity in one hour, and during discharging, 1 C is the current that fully discharges a battery in one hour). In addition, in the temperature increasing charging step, the battery charging method can charge with a charging current resulting in a rate of battery temperature rise of 1° C./minute to 5° C./minute.

In the temperature increasing charging step, the battery charging method provides continuous current flow to the battery. In the temperature maintaining charging step, the battery charging method is pulse charging of the battery and can control average charging current by changing the pulse charging duty factor according to battery temperature. When battery temperature rises, the pulse charging duty factor is decreased, and when battery temperature drops, the pulse charging duty factor is increased to control average charging current and maintain battery temperature at the holding temperature.

In the temperature increasing charging step, the battery charging method can suspend charging if the rate of battery temperature increase exceeds a specified rate.

Further, the battery charging method can detect battery temperature at the beginning of charging. When battery temperature is within a specified range for commencing charging, the temperature increasing charging step is started. When battery temperature is either below or above the specified range for commencing charging, charging can be performed while monitoring battery voltage.

DETAILED DESCRIPTION OF THE INVENTION

Figure 1:
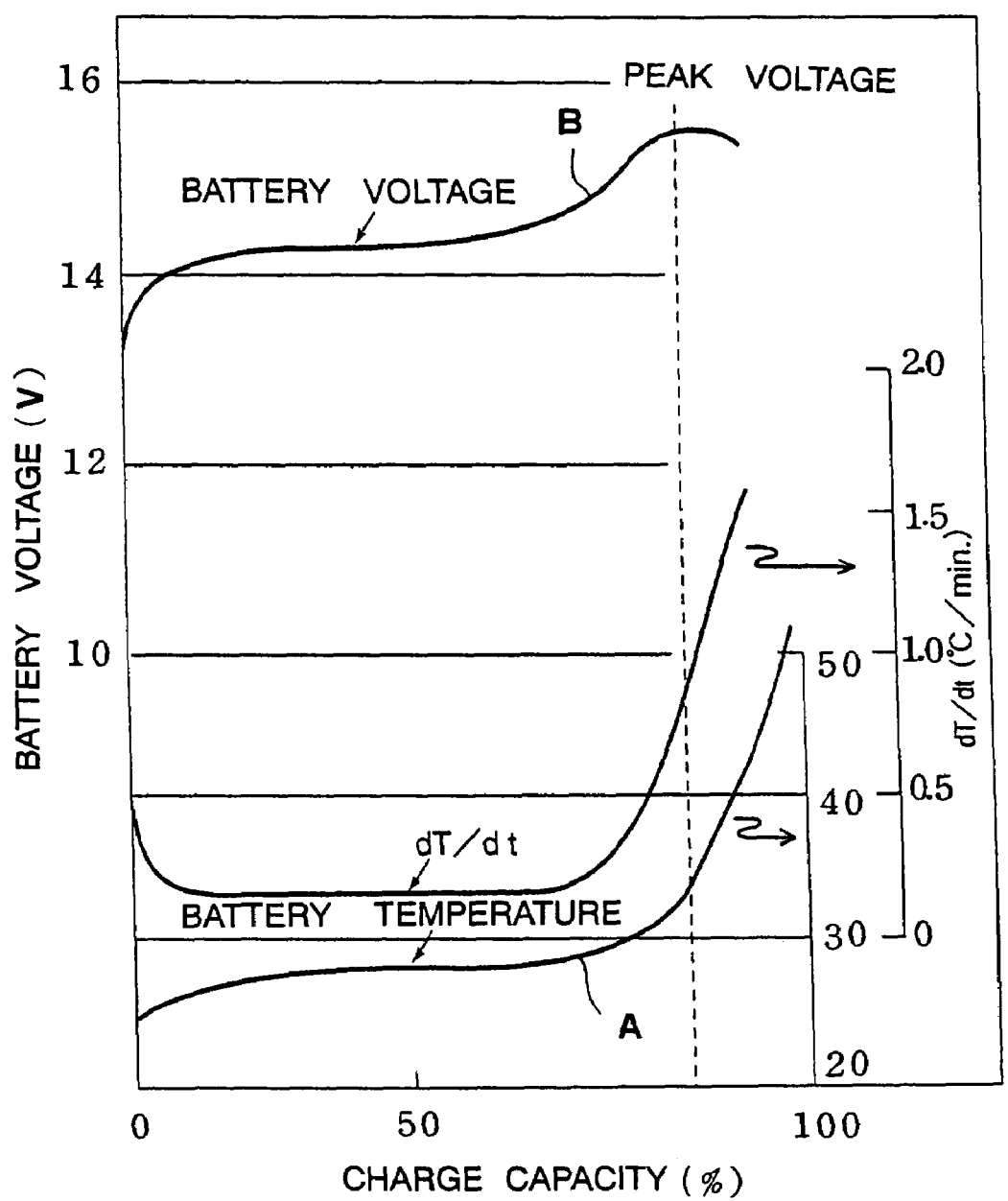
FIG. 1 is a graph showing battery temperature and voltage characteristics during constant current charging.
Figure 2:
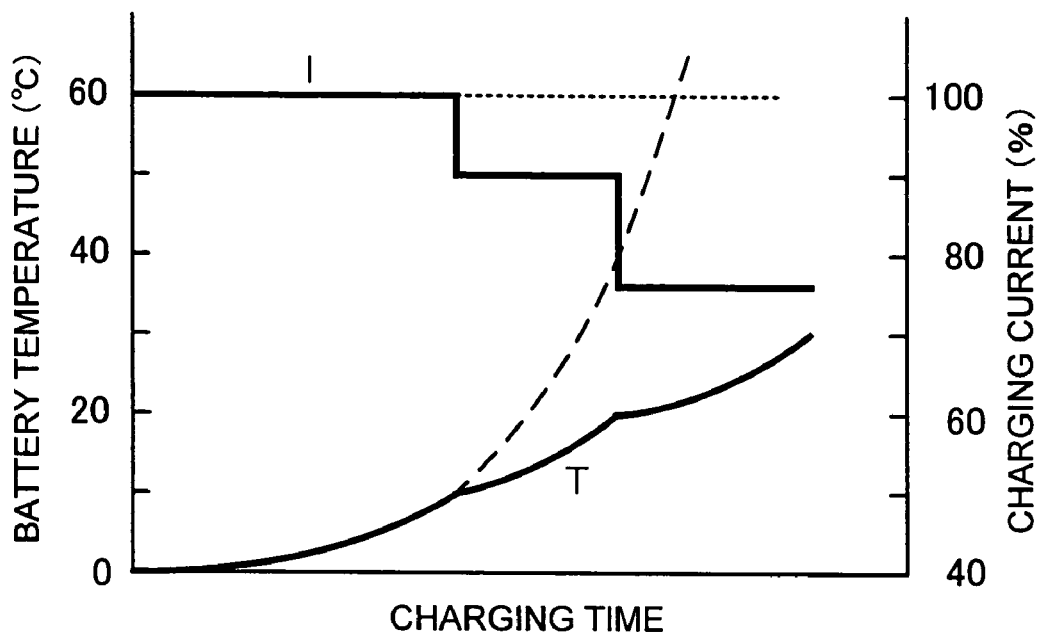
FIG. 2 is a graph showing battery temperature and voltage characteristics when the battery is charged by a related art charging method.
Figure 3:
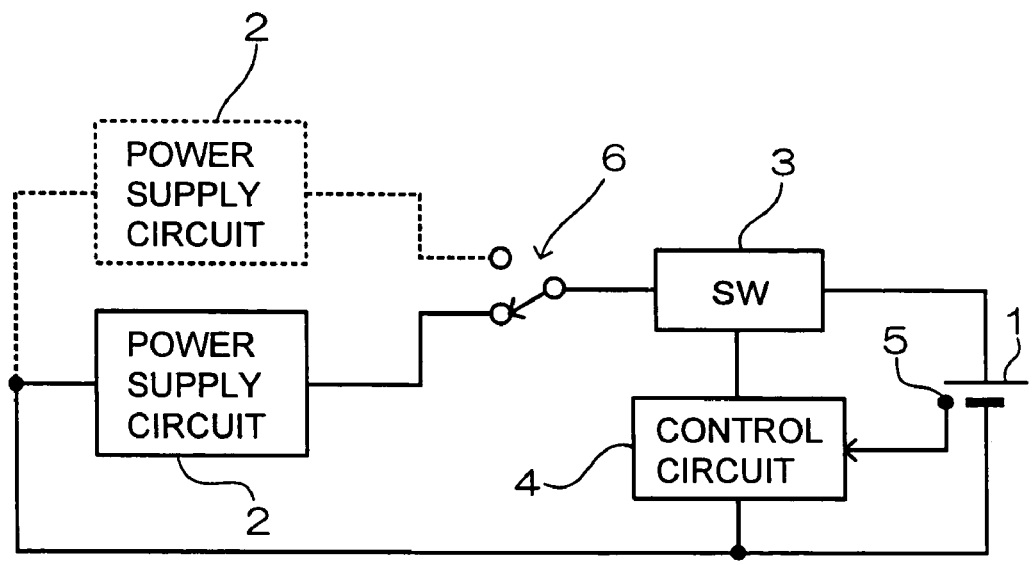
FIG. 3 is a circuit diagram showing one example of a charging circuit used in an embodiment of the charging method of the present invention.

The charging circuit shown in FIG. 3 is provided with a power supply circuit 2 to supply charging current to charge the battery 1, a switching device 3 connected between the power supply circuit 2 and the battery 1 to regulate average charging current to the battery 1, a control circuit 4 to control charging current by switching the switching device 3 on and off, and a temperature sensor 5 to detect battery temperature and input a temperature signal to the control circuit 4.

When a standard size battery (TAN 1–4), such as size D, C, AA, AAA, is used, the temperature sensor 5 is disposed in intimate contact with the battery 1 when it is set in a battery charger adapter (not illustrated). When the battery 1 is a battery pack, the temperature sensor 5 is disposed inside the battery pack in intimate contact with the battery itself.

Figure 4:
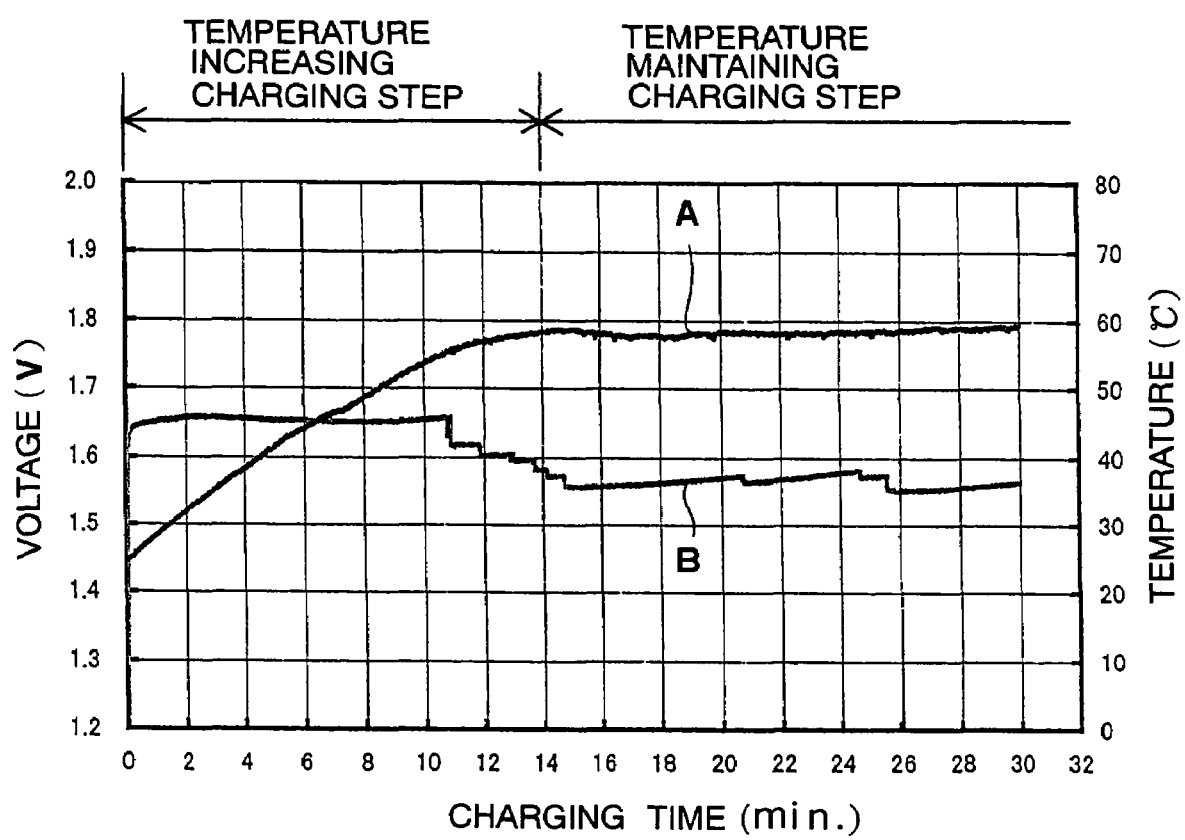
FIG. 4 is a graph showing battery temperature and voltage characteristics during battery charging by an embodiment of the charging method of the present invention.

The graph of FIG. 4 shows battery temperature rise and battery voltage variation characteristics when a battery 1 is charged with the charging circuit of FIG. 3. In FIG. 4, curve A is the battery temperature rise characteristic curve, and curve B is the battery voltage variation characteristic curve. As shown in FIG. 4, the charging circuit of FIG. 3 does not reduce the rate of battery temperature rise at full charge, but rather raises battery temperature to a specified temperature at the commencement of charging in a temperature increasing charging step, and subsequently charges while maintaining battery temperature at a holding temperature in a temperature maintaining charging step. Consequently, high current is forced at the beginning of charging and battery temperature is raised. In other words, the battery 1 is charged with a current large enough to raise the battery temperature. Although the battery 1 is charged by high current at this time, no battery performance degradation occurs because battery temperature does not immediately become high. Therefore, the battery 1 can be charged to high capacity during this time.

With the switching device 3 in the ON state, the power supply circuit 2 is capable of high current output to charge a battery 1 with an average of 1.5 C to 10 C, preferably 2 C to 8 C, and still more preferably 2 C to 5 C. The power supply circuit can be configured as a separate unit and connected to the control circuit via extension leads. However, the power supply circuit and control circuit can also be housed in the same case.

As shown in FIG. 3, the charging circuit can also switch between a plurality of power supply circuits 2 to charge a battery 1. The plurality of power supply circuits 2 are connected to the switching device 3 via a switch 6. The switch 6 switches to select the power supply circuit 2 for battery 1 charging. The plurality of power supply circuits 2 have different peak currents during pulse charging. Even if average battery charging currents are the same, battery 1 heat generation will increase with high peak current during pulse charging. Therefore, if the power supply circuit 2 is switched to a lower peak current supply when the battery 1 is charged with high current, battery 1 heat generation can be reduced. Consequently, battery temperature rise can be reduced while charging with a higher average current.

The switching device 3 is a bipolar transistor or field effect transistor (FET) which is switched by the control circuit 4 to pulse charge a battery 1. The switching device 3 is held in the ON state without switching to initially charge the battery 1 with high current until battery temperature rises to a specified temperature and holding temperature. In this case, charging is constant current charging. The switching device 3 can also be switched ON and OFF at a prescribed duty factor to initially charge the battery 1 with pulsed high current (high average current) until battery temperature rises to the specified temperature and holding temperature.

Average charging current for pulse charging a battery 1 is regulated by the duty factor for switching the switching device 3 ON and OFF. The duty factor (Q) for pulse charging is a ratio of the time the switching device 3 is ON (ton) and the time the switching device 3 is OFF (toff), and is given by the following formula.

$$Q = ton/(ton + toff)$$

Consequently, as the duty factor for switching the switching device 3 ON and OFF is decreased, average charging current decreases, and conversely as the duty factor is increased, average charging current increases.

The control circuit 4 detects battery temperature from a signal input from the temperature sensor 5, and switches the switching device 3 ON and OFF at a prescribed duty factor. The duty factor for switching the switching device 3 ON and OFF is small for high battery temperature, and is increased as battery temperature drops to maintain battery temperature at the holding temperature. As shown in FIG. 4, since battery temperature is initially low at the beginning of charging, the battery 1 is charged with high current until battery temperature reaches a specified temperature. Subsequently, the control circuit 4 controls the duty factor of the switching device 3 to maintain battery temperature at a holding temperature. The control circuit 4 switches the switching device 3 ON and OFF with a period of 1 msec to 10 sec, preferably 10 msec to 2 sec, and still more preferably 50 msec to 2 sec.

When temperature detected by the temperature sensor 5 is lower than the holding temperature, the control circuit 4 increases the duty factor to increase the average pulse charging current and raise battery 1 temperature. When battery temperature rises to the holding temperature, the control circuit 4 controls the switching device 3 by reducing the duty factor to prevent battery temperature from exceeding the holding temperature. Further, the control circuit 4 controls the switching device 3 duty factor to prevent battery temperature from dropping below the holding temperature. Consequently, the control circuit 4 charges the battery 1 neither by constant current charging nor by constant voltage charging. The control circuit 4 controls the switching device 3 duty factor to regulate average charging current and control battery 1 temperature to behave as shown by curve A of FIG. 4.

The charging circuit of FIG. 3 charges a battery 1 by the following steps. Although the following is an example of a nickel hydrogen battery charging method, a nickel cadmium battery can also be charged in the same manner by changing the charging current.

(1) First, prior to beginning charging, the temperature sensor 5 in the charging circuit detects the temperature of the battery to be charged. When the detected battery temperature is within the specified range for commencing charging, the temperature increasing charging step is initiated. The specified temperature range for commencing charging with the temperature increasing charging step is 0° C. to 40° C., and preferably 10 C to 30° C. When battery temperature is below or above the specified range for commencing charging, ordinary charging is initiated while detecting battery voltage. Ordinary charging controls charging current for charging at or below 1 C while monitoring battery voltage, and full charge is determined when battery voltage reaches a peak or drops a ΔV from that peak.

Further, remaining capacity of the battery 1 is determined from battery voltage. This is done because if a battery near full charge is charged according to the temperature increasing charging step, over-charging will occur and battery performance will degrade. A battery with voltage below a prescribed battery voltage is judged to have low remaining capacity, and charging is started according to the temperature increasing charging step. A battery with voltage higher than the prescribed battery voltage is judged to have high remaining capacity with the likelihood of over-charging if charged by the temperature increasing charging step. Therefore, ordinary charging is started for a battery with voltage higher than the prescribed battery voltage.

In addition, internal resistance of the battery 1 is detected at the start of charging. When internal resistance is higher than a prescribed resistance, no transition to the temperature increasing charging step is made and ordinary charging is performed. If internal resistance becomes smaller than the prescribed resistance after ordinary charging, the temperature increasing charging step may be started as well.

(2) In the case of battery 1 temperature within the specified range for commencing charging and battery voltage lower than the prescribed battery voltage, the temperature increasing charging step is started. In the temperature increasing charging step, the battery 1 is charged with a high current which raises battery temperature at a specified rate. In this step, the battery 1 is charged with an average current that makes battery temperature rise at a rate of about 3° C./minute. In the case of a TAN-3 type (=AA type) nickel hydrogen battery with a nominal capacity of 2100 mAh, the rate of temperature rise becomes 3° C./minute with an average charging current for 2 C to 3 C. However, in this step, the battery 1 can be charged with an average charging current that makes the rate of temperature rise 1° C./minute to 5° C./minute. Further, the average charging current may charge at 1.5 C to 10 C as well.

When charging with a specified current (for example, charging at 2.5 C) which would normally raise battery temperature at a rate of 2° C./minute to 3° C./minute, and a rate of temperature rise greater than the specified value is detected (for example, 5° C./minute), or a −ΔV (for example, 60 mV) is detected, the battery is assumed to be at full charge and charging is terminated to prevent over-charging. As described above, when battery voltage is measured and used to judge remaining capacity prior to charging, and a battery with high remaining capacity is charged by ordinary charging to prevent over-charging, there are cases when battery voltage does not accurately reflect the remaining capacity. This step prevents over-charging that type of battery. Specifically, suppose a battery with high actual remaining capacity had low battery voltage and was judged to have low remaining capacity. If such a battery were charged by the temperature increasing charging step, full charge would be judged and over-charging would be prevented when the rate of temperature rise was detected above the specified rate or when −ΔV was detected.

In this step, the switching device 3 is maintained in the ON state, or the duty factor of the switching device 3 is large to make the average charging current within the previously mentioned range. When battery temperature rises to the specified temperature and approaches the holding temperature, average charging current is decreased to reduce the rate of battery 1 temperature rise. For example, if the holding temperature is approximately 57° C. to 60° C., and the rising specified temperature (for example, approximately 55° C.) is detected, average charging current is decreased to reduce the rate of battery 1 temperature rise.

In FIG. 4, when battery temperature rises to the rising specified temperature of approximately 55° C., that temperature is detected, and average charging current is reduced to reduce the rate of temperature rise and approach the holding temperature (curve A, temperature increasing charging step at about 11 minutes of charging time in FIG. 4). Average charging current is controlled by reducing the ON-OFF duty factor of the switching device 3. In this type of charging method which reduces average charging current when battery 1 temperature approaches the holding temperature and reaches the rising specified temperature, overshoot of the holding temperature is prevented, and battery 1 degradation due to the negative effects of high temperature can be effectively prevented. However, the battery 1 may also be charged with an average charging current which maintains the specified rate of temperature rise until the holding temperature is reached.

Further, when the specified temperature in the temperature increasing charging step (for example, the rising specified temperature of approximately 55° C., or the holding temperature described below) is not reached by specified time (for example, 15 minutes), charging can be controlled according to the temperature maintaining charging step described below. Average charging current in the temperature maintaining charging step is controlled to about half that for the temperature increasing charging step (for charging at about 1.5 C). In this manner, for a battery with low temperature (approximately 0° C. to 10° C.) measured prior to charging, negative effects on the battery due to extremely rapid temperature rise can be alleviated.

(3) When battery temperature rises to the holding temperature at the end of the temperature increasing charging step, average charging current is regulated to maintain battery temperature at the holding temperature for charging according to the temperature maintaining charging step. In this temperature maintaining charging step, the control circuit 4 controls the ON-OFF duty factor of the switching device 3 to regulate the average current for pulse charging and maintain battery temperature at the holding temperature. In this step, the temperature sensor 5 detects battery temperature and inputs a temperature signal to the control circuit 4. The control circuit 4 controls the ON-OFF duty factor of the switching device 3 based on the detected battery temperature. When battery temperature becomes high, the duty factor is reduced, average charging current is decreased, and battery temperature is lowered. When battery temperature becomes low, the duty factor is increased, average charging current is increased, and battery temperature is raised. In this fashion, charging is performed while maintaining battery temperature at the holding temperature. In the temperature maintaining charging step, it is desirable to hold battery temperature at a single temperature (for example, 58° C.).

Here, the holding temperature is set near a maximum temperature which is below the temperature that results in performance degradation and negative effects on the battery. In addition, the holding temperature is set to a temperature at which the user has no problem touching the battery 1 and does not feel that it is abnormally hot. For this level of holding temperature, the maximum is set about 70° C., preferably 65° C. or less, and more preferably 63° C. or less. As a holding temperature range, 50° C. to 65° C. is preferable, 53° C. to 63° C. is more preferable, and 56° C. to 61° C. and 57° C. to 60° C. are even more preferable.

To maintain battery temperature at the holding temperature in the present embodiment, temperature is controlled as follows. First, a specified control temperature (for example, 58° C.) is set for the holding temperature. For example, for every 1° C. that the detected battery temperature is above the specified control temperature, average charging current is reduced in stages, like step by step. Similarly, for every 1° C. that the detected battery temperature is below the specified control temperature, average charging current is increased in stages, step by step. By this type of control, charging is performed while maintaining battery temperature at the holding temperature.

In place of the specified control temperature described above, a specified control temperature range (for example, 57° C. to 59° C.) may be set. For example, for every 1° C. that the detected battery temperature is above the specified control temperature range, average charging current is reduced in stages, step by step. Similarly, for every 1° C. that the detected battery temperature is below the specified control temperature range, average charging current is increased in stages, step by step. Again, by this type of control, charging is performed while maintaining battery temperature at the holding temperature.

In this temperature maintaining charging step, when the battery 1 nears full charge, the tendency for battery temperature to rise becomes stronger even though average charging current is reduced. Consequently, as the battery 1 nears full charge, battery temperature rises or tries to rise, but average charging current decreases to maintain the holding temperature. Specifically, the control circuit 4 controls the ON-OFF duty factor of the switching device 3 to an extremely small value. As a result, the control circuit 4 abruptly decreases the average charging current as the battery 1 nears full charge. Consequently, in the temperature maintaining charging step, even if full battery charge is not detected and charging is not suspended, average charging current is rapidly reduced and over-charging is prevented. In the temperature maintaining charging step of the present embodiment, charging is terminated by a timer. The timer is set to a time period (for example, approximately 30 minutes) that will sufficiently charge the battery 1 to approximately full charge. In the present embodiment, since battery temperature rises and average charging current decreases near full charge as described above, charging is terminated by detecting this decrease in current, even if it is prior to timer expiration.

In addition, charging may also be terminated at full charge by detecting a rate of temperature rise above a specified value (for example, 2° C./minute), by detecting battery temperature above a specified value (for example, 62° C.), or by detecting a $-\Delta V$ (for example, 60 mV).

Further, when charging the battery by the temperature maintaining charging step, internal resistance of the battery 1 is detected. When battery 1 internal resistance becomes greater than a specified value, ordinary charging is performed and charging current is reduced. Even in ordinary charging, battery 1 temperature is kept from becoming higher than the holding temperature.

(4) By the temperature increasing charging step and temperature maintaining charging step above, the battery 1 is essentially fully charged. However, the battery 1 does not completely reach full charge. Ordinary charging can be performed after the temperature maintaining charging step to fully charge the battery 1 to completion.

The above-mentioned charging method charges the battery 1 by pulse-charge in the temperature increasing charging step and the temperature maintaining charging step. Instead of pulse-charging by controlling duty factor, a charging method of controlling charging current continuously with average specified current can be used.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims.

This application is based on applications No. 2003-279605 filed in Japan on Jul. 25, 2003, and No. 2003-349543 filed in Japan on Oct. 8, 2003, the contents of which are incorporated hereinto by reference.

What is claimed is:

1. A battery charging method for charging a battery, the battery charging method comprising a temperature maintaining charging step of detecting a battery temperature of the battery, controlling an average charging current to make the battery temperature become equal to a holding temperature, and charging the battery while maintaining the battery temperature at the holding temperature,
   wherein the holding temperature is 53° C. to 70° C. and is set near a maximum temperature that is below a temperature that results in performance degradation and negative effects on the battery.

2. A battery charging method as recited in claim 1, further comprising a temperature increasing charging step of, prior to the temperature maintaining charging step, charging the battery with a current that causes the battery temperature to rise until reaching the holding temperature, whereby when the battery temperature reaches the holding temperature by the charging in the temperature increasing charging step, the temperature increasing charging step transitions to the temperature maintaining charging step.

3. A battery charging method as recited in claim 2, wherein the current in the temperature increasing charging step provides charging of 1.5 C to 10 C.

4. A battery charging method as recited in claim 2, wherein the current in the temperature increasing charging step provides charging of 2 C to 8 C.

5. A battery charging method as recited in claim 2, wherein the current in the temperature increasing charging step provides charging of 2 C to 5 C.

6. A battery charging method as recited in claim 2, wherein the current in the temperature increasing charging step results in a rate of battery temperature rise of 1° C./minute to 5° C./minute.

7. A battery charging method as recited in claim 2, wherein the charging in the temperature increasing charging step comprises charging the battery with a continuous flow of current,
the charging in the temperature maintaining charging step comprises pulse charging the battery, and
the controlling in the temperature maintaining charging step comprises controlling the average charging current by changing a pulse charging duty factor according to the battery temperature, such that when the battery temperature increases, the pulse charging duty factor for pulse charging the battery is reduced, and when the battery temperature decreases, the pulse charging duty factor for pulse charging the battery is increased, whereby the average charging current is controlled to charge while maintaining the battery temperature at the holding temperature.

8. A battery charging method as recited in claim 2, wherein the temperature increasing charging step further comprises, if a rate of battery temperature rise during the temperature increasing charging step is equal to or exceeds a specified rate, suspending the charging during the temperature increasing charging step.

9. A battery charging method for charging a battery, the battery charging method comprising:
detecting a battery temperature of the battery at a start of charging;
when the battery temperature is within a specified range, performing:
a temperature increasing charging step of charging the battery with a current that causes the battery temperature of the battery to rise unit reaching a holding temperature; and
a temperature maintaining charging step of, when the battery temperature reaches the holding temperature in the temperature increasing charging step, detecting the battery temperature, controlling an average charging current to make the battery temperature become equal to the holding temperature, and charging the battery while maintaining the battery temperature at the holding temperature; and
when the battery temperature is not within the specified temperature range, performing charging of the battery while monitoring a battery voltage of the battery.

10. A battery charging method as recited in claim 9, wherein the specified temperature range is 0° C. to 40° C.

11. A battery charging method as recited in claim 9, wherein the specified temperature range is 10° C. to 30° C.

12. A battery charging method as recited in claim 9, wherein the charging of the battery while monitoring the battery voltage has a charging current to provide charging of 1 C or below.

13. A battery charging method as recited in claim 2, further comprising:
detecting an internal resistance of the battery at a start of charging;
if the internal resistance is greater than a specified resistance, performing charging of the battery while monitoring a battery voltage of the battery; and
if the internal resistance becomes less than the specified resistance after the charging of the battery while monitoring the battery voltage, starting the temperature increasing charging step.

14. A battery charging method as recited in claim 13, wherein the charging of the battery while monitoring the battery voltage has a charging current to provide charging of 1 C or below.

15. A battery charging method for charging a battery, the battery charging method comprising:
a temperature increasing charging step of charging the battery with a current that causes a battery temperature of the battery to rise until reaching a holding temperature;
a temperature maintaining charging step of, when the battery temperature reaches the holding temperature in the temperature increasing charging step, detecting the battery temperature, controlling an average charging current to make the battery temperature become equal to the holding temperature, and charging the battery while maintaining the battery temperature at the holding temperature,
wherein, if the battery temperature reaches a rising specified temperature, the charging in the temperature increasing charging step comprises decreasing an average charging current to reduce a rate of battery temperature rise.

16. A battery charging method for charging a battery, the battery charging method comprising:
determining a remaining capacity of the battery from a battery voltage of the battery;
if the remaining capacity of the battery is below a prescribed battery voltage, performing:
a temperature increasing charging step of charging the battery with a current that causes a battery temperature of the battery to rise until reaching a holding temperature;
a temperature maintaining charging step of, when the battery temperature reaches the holding temperature in the temperature increasing charging step, detecting the battery temperature, controlling average charging current to make the battery temperature become equal to the holding temperature, and charging the battery while maintaining battery temperature at the holding temperature; and
if the remaining capacity of the battery is above the prescribed battery voltage with a likelihood of overcharging, performing charging of the battery while monitoring the battery voltage.

* * * * *